US008002972B2

(12) United States Patent
Morris, Jr. et al.

(10) Patent No.: US 8,002,972 B2
(45) Date of Patent: Aug. 23, 2011

(54) PETROLEUM PRODUCTS FROM OIL SHALE

(75) Inventors: Robert D. Morris, Jr., Orem, UT (US); Robert D. Morris, III, Saratoga Springs, UT (US)

(73) Assignee: EnShale, Inc., St. George, UT (US)

( * ) Notice: Subject to any disclaimer, the term of this patent is extended or adjusted under 35 U.S.C. 154(b) by 450 days.

(21) Appl. No.: 11/974,492

(22) Filed: Oct. 12, 2007

(65) Prior Publication Data
US 2009/0095659 A1  Apr. 16, 2009

(51) Int. Cl.
*C10G 1/08* (2006.01)

(52) U.S. Cl. ........ 208/400; 208/402; 208/408; 208/409; 208/426; 208/427; 208/431; 201/15; 201/16; 201/20; 201/27; 201/34

(58) Field of Classification Search .................. 422/244; 208/198, 400, 402, 408, 409, 431, 426, 427; 201/20, 27, 15, 16, 34
See application file for complete search history.

(56) References Cited

U.S. PATENT DOCUMENTS

| | | | |
|---|---|---|---|
| 1,383,205 A | 6/1921 | Edward E. Hedges | |
| 1,423,716 A | 7/1922 | Hedges | |
| 1,717,786 A | 6/1929 | Clayton-Kennedy | |
| 2,435,746 A * | 2/1948 | Jones | 201/29 |
| 2,441,386 A | 5/1948 | Berg | 202/14 |
| 2,664,389 A | 12/1953 | Rex et al. | 202/6 |
| 3,281,349 A | 10/1966 | Evans | 208/11 |
| 3,336,104 A * | 8/1967 | Miller | 423/305 |
| 3,384,569 A | 5/1968 | Peet | 208/11 |
| 3,475,319 A | 10/1969 | MacLaren | 53/6 |
| 3,496,094 A | 2/1970 | Smith | 1/10 |
| 3,844,929 A | 10/1974 | Wunderlich et al. | 208/11 |
| 3,939,057 A | 2/1976 | Reed, Jr. | 208/11 |
| 3,988,123 A | 10/1976 | Coates | 48/73 |

(Continued)

FOREIGN PATENT DOCUMENTS
FR  1035067  8/1953

(Continued)

OTHER PUBLICATIONS
Healy, Shelby. *Pyrolysis of Oil Shale in a Rotary Kiln* (Jul. 2004) (M.S. thesis, University of Utah).

(Continued)

*Primary Examiner* — Walter D Griffin
*Assistant Examiner* — Huy-Tram Nguyen
(74) *Attorney, Agent, or Firm* — Kent S. Burningham

(57) ABSTRACT

A system for producing petroleum products from oil shale includes one or plural kiln lines made up of plural series-connected, indirect-fired, inclined rotary kilns. Plural kiln lines are operated for parallel processing. Oil shale is advanced through kilns in succession and exhausted from each kiln line substantially free of hydrocarbons. Successive kilns along the advancement of oil shale are maintained at successively higher temperatures. A fuel distinct from hydrocarbons in oil shale, such as syngas from a gasifier or hydrogen gas from a separator, drives pyrolysis to extract hydrocarbons. A refining unit located proximate to the kiln lines upgrades extracted hydrocarbons into petroleum products and separates the petroleum products by criteria. A heat extraction unit recovers heat from exhausted oil shale for reuse in kilns. A method involves drying oil shale followed by heating dry oil shale in successively hotter pyrolysis environments.

37 Claims, 4 Drawing Sheets

U.S. PATENT DOCUMENTS

| | | | | |
|---|---|---|---|---|
| 4,058,205 A | * | 11/1977 | Reed, Jr. | 202/86 |
| 4,060,479 A | * | 11/1977 | Barcellos | 208/401 |
| 4,140,478 A | * | 2/1979 | Kawakami et al. | 432/13 |
| 4,148,359 A | * | 4/1979 | Laumbach et al. | 166/261 |
| 4,210,492 A | * | 7/1980 | Roberts | 201/12 |
| 4,258,227 A | | 3/1981 | Allen et al. | 585/469 |
| 4,272,255 A | | 6/1981 | Coates | 48/63 |
| 4,319,982 A | * | 3/1982 | Meisenburg et al. | 208/408 |
| 4,325,787 A | | 4/1982 | Strumskis | 202/106 |
| 4,401,402 A | | 8/1983 | Casperson | 414/218 |
| 4,405,438 A | | 9/1983 | Faulkner et al. | 208/11 R |
| 4,427,529 A | * | 1/1984 | Nishio | 208/411 |
| 4,435,271 A | | 3/1984 | Deering et al. | 208/11 R |
| 4,439,306 A | | 3/1984 | Voetter et al. | 208/11 R |
| 4,446,001 A | | 5/1984 | Deering et al. | 208/11 R |
| 4,448,668 A | | 5/1984 | Deering | 208/11 R |
| 4,451,352 A | * | 5/1984 | Twyman | 201/32 |
| 4,461,674 A | * | 7/1984 | Faulkner et al. | 202/85 |
| 4,515,679 A | | 5/1985 | Deering | 208/11 R |
| 4,519,874 A | * | 5/1985 | Bertram | 201/39 |
| 4,523,979 A | | 6/1985 | Deering et al. | 202/99 |
| 4,534,849 A | | 8/1985 | Edwards | 208/11 R |
| 4,564,437 A | | 1/1986 | Deering | 208/11 R |
| 4,566,964 A | | 1/1986 | Friedman | 208/8 LE |
| 4,692,239 A | | 9/1987 | Friedman | 208/430 |
| 4,725,350 A | * | 2/1988 | Smith | 208/408 |
| 4,778,626 A | | 10/1988 | Ramm et al. | 252/628 |
| 4,983,278 A | * | 1/1991 | Cha et al. | 208/407 |
| 5,034,021 A | * | 7/1991 | Richardson | 48/77 |
| 5,041,209 A | * | 8/1991 | Cha et al. | 208/251 R |
| 5,484,465 A | | 1/1996 | Hilliard et al. | 48/76 |
| 5,499,586 A | | 3/1996 | Davis | 110/246 |
| 5,573,559 A | | 11/1996 | Hilliard et al. | 48/203 |
| 5,756,871 A | * | 5/1998 | Wang | 585/241 |
| 5,787,822 A | | 8/1998 | Hilliard | 110/229 |
| 6,221,310 B1 | | 4/2001 | Checketts et al. | 266/48 |
| 6,657,095 B1 | * | 12/2003 | Holden et al. | 585/241 |
| 6,709,573 B2 | | 3/2004 | Smith | 208/390 |
| 6,758,150 B2 | | 7/2004 | Ballantine et al. | 110/229 |
| 6,960,234 B2 | | 11/2005 | Hassett | 48/77 |
| 2001/0015060 A1 | * | 8/2001 | Bronicki et al. | 60/39.6 |
| 2003/0098262 A1 | * | 5/2003 | Rendall | 208/431 |
| 2004/0007507 A1 | | 1/2004 | Smith | 208/400 |
| 2005/0173305 A1 | | 8/2005 | Smith | 208/434 |
| 2006/0076275 A1 | * | 4/2006 | Smith | 208/408 |
| 2008/0202985 A1 | * | 8/2008 | Hatfield et al. | 208/403 |
| 2009/0095659 A1 | | 4/2009 | Morris, Jr. et al. | 208/408 |

FOREIGN PATENT DOCUMENTS

| | | |
|---|---|---|
| WO | 2004/007641 | 1/2004 |
| WO | 2009/048615 | 4/2009 |

OTHER PUBLICATIONS

Al-Ayed, Omar S., "Sweeping Gases Influence on Liquid Product and Sulfur of Oil Shale", *Amman Conference on Trends in Oil Shale* (Nov. 7-9, 2006).

* cited by examiner

PETROLEUM PRODUCTS FROM OIL SHALE

BACKGROUND

A. Field of the Invention

The present invention relates generally to the extraction from oil shale of useful hydrocarbons as petroleum products. More particularly, the present invention pertains to systems and methods for deriving refined petroleum products directly from oil shale.

B. Background of the Invention

Oil shale reserves are massive, but relatively untapped. Therefore, these reserves represent a promising source of combustible liquid hydrocarbons for use in contemporary societies. The useful hydrocarbons reside in oil shale in the form of so-called kerogens. Kerogens encompass an intermixed diversity of potentially useful hydrocarbons that range in weight from very light and highly volatile to very heavy and resistive to vaporization.

One approach to extracting useful hydrocarbons from oil shale involves the application of heat to the oil shale, and ultimately the vaporization and capture of the useful hydrocarbons freed thereby from the oil shale. This type of processing is referred to as pyrolysis. Existing pyrolysis technologies utilize processes that are poorly integrated, both physically and conceptually. Such systems are not, therefore, capable of producing petroleum products, either of an adequate quality on in a sufficient volume, as to be able to compete effectively in the marketplace against petroleum products from other hydrocarbon sources.

SUMMARY OF THE INVENTION

The present invention provides systems and methods that overcome numerous of the shortcomings in existing approaches to extracting useful hydrocarbons from oil shale.

It is thus an objective of the present invention to enable petroleum products to be derived from oil shale efficiently, thereby to compete effectively as a marketplace alternative to other sources of combustible hydrocarbons.

Certain features and advantages of the invention have been generally described in this summary section; however, additional features, advantages, and embodiments are presented herein or will be apparent in view of the drawings, specification, and claims hereof. Accordingly, it should be understood that the scope of the invention is not to be limited by the particular characterizations presented in this summary section.

BRIEF DESCRIPTION OF THE DRAWINGS

Reference will be made to exemplary embodiments of the present invention that are depicted in the accompanying figures. Those figures are intended to be illustrative, rather than limiting. Although the present invention is generally described in the context of those embodiments, it is not intended by so doing to limit the scope of the present invention to the particular features of the embodiments depicted and described.

DETAILED DESCRIPTION OF THE INVENTION

Figure 1:
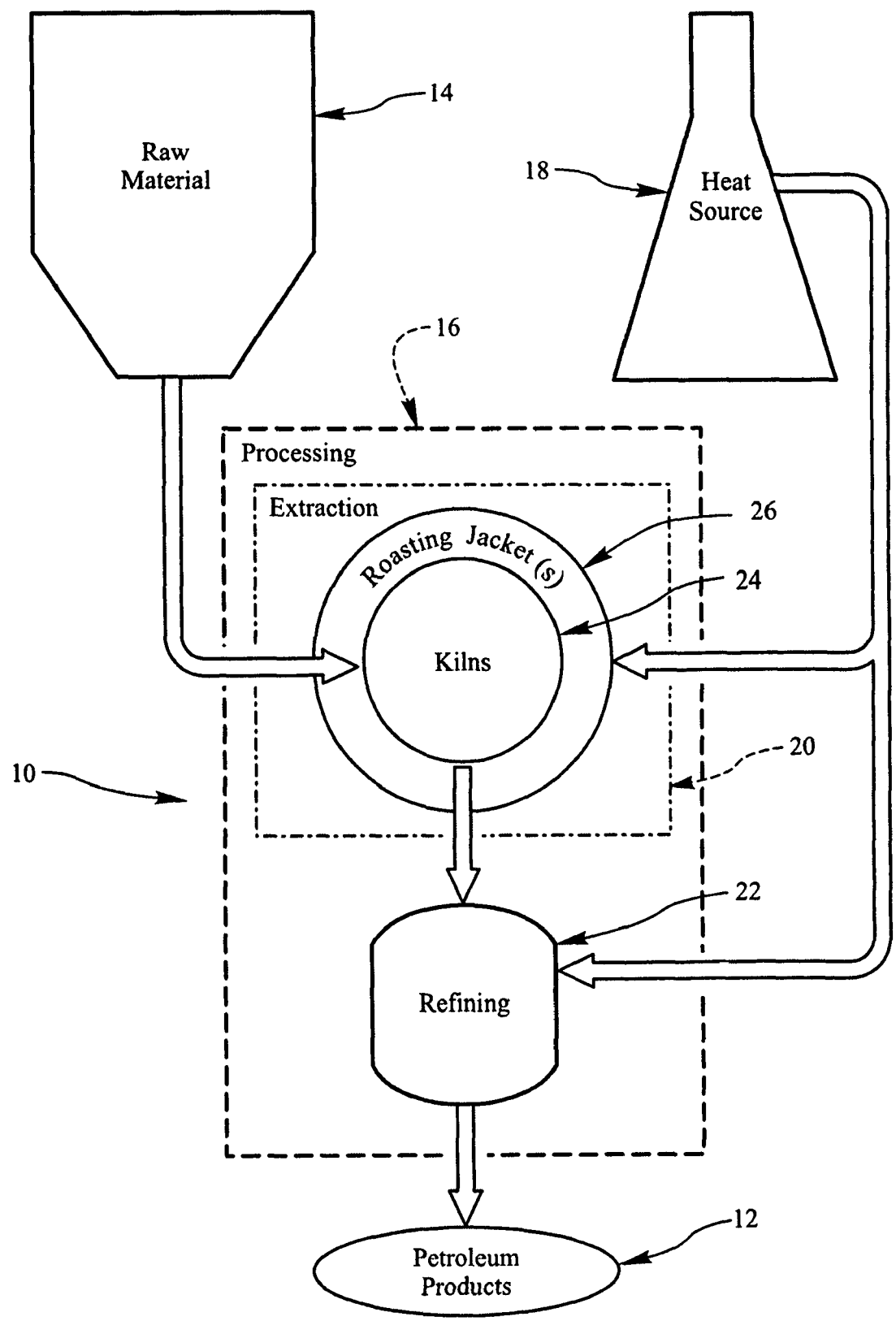
FIG. 1 is a diagrammatic overview depiction of a system and a method embodying teachings of the present invention.

In the following description, for purpose of explanation, specific details are set forth in order to provide an understanding of the present invention. The present invention may, however, be practiced without some or all of these details. The embodiments of the present invention described below may be incorporated in whole or in part into a number of different systems and methods. Structures, materials, and procedures are depicted in diagrammatic from, thereby to be illustrative of structures, materials, and procedures in exemplary embodiments of the present invention. Such structures, materials, and procedures are not, therefore, to be used as a pretext by which to obscure broad teachings of the present invention. Connections between structures, materials, and procedures depicted in the figures are not intended to be limited to direct connections. Rather, such connections may be modified, reformatted, or otherwise changed by intermediary elements.

When the specification makes reference to "one embodiment" or to "an embodiment" it is intended mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

A. Overview

The methods and systems of the present invention focus on petroleum products as the key output, rather than on using any fraction of that potential output, for example, to generate electricity for consumption on site or elsewhere. Toward that end, in one aspect of the present invention, the quantity and quality of the process output is optimized by minimizing the consumption of any of the BTU content of the potentially useful hydrocarbons in the oil shale being processed; even to obtain heat with which to drive pyrolysis. In some inventive embodiments, none of the BTU content of the potentially useful hydrocarbons in the oil shale being processed is used at all.

The use as a heat source in the kiln array of a fuel other than the useful hydrocarbons in the oil shale granules being processed has a positive impact on the value of the oil vapors produced. The full BTU content of the oil shale granules is conserved in those extracted oil vapors. It is the lighter hydrocarbons that are consumed when oil vapors from oil shale granules are used to drive pyrolysis. As a result of minimizing reliance of the inventive system on the BTU content of oil shale, lighter hydrocarbons in the oil shale granules are preserved, leading to output oil vapor that may even take that form of light crude that requires only routine upgrading to be converted into useable high-grade petroleum.

An inventive system is optimally installed and used in proximity to a mine or other source of oil shale. The oil shale is processed at a crusher into oil shale granules of about 0.375 inches in diameter. These are fed into kilns of the system. There moisture ($H_2O$) is first removed. Then in successive stages, useful hydrocarbons in the form of oil vapors are extracted by pyrolysis. Spent shale granules are transported or stored, possibly within the mine from which the oil shale originated.

Oil vapors are processed further at a refining unit. There the extracted hydrocarbons are upgraded into petroleum products, and the petroleum products are separated according to predetermined criteria, such as weight, type, and use. It is preferred, but not in all instances essential, that this distillation and cracking of extracted hydrocarbons be performed on site at the kilns, and immediately while the oil vapors containing those extracted hydrocarbons emerging from pyrolysis remain hot.

Heat for driving pyrolysis is derived from coal, which is likely transported to the site of the system from a remote source. In the system and method of the present invention, about one (1) ton of coal is required to process each ten (10) tons of oil shale. The coal is pulverized at the site of the system to a fineness of about 200 mesh and then converted in a gasifier at the site of the system into synthetic coal gas, so called "syngas". The syngas is used primarily or solely for driving pyrolysis of oil shale. Hydrogen ($H_2$) gas may in addition be used to supplement the syngas in driving pyrolysis.

Optionally, some of the syngas is processed in a hydrogen separator into hydrogen ($H_2$) gas, which is employed primarily in the refining unit of the system. At the refining unit, hydrogen ($H_2$) gas is used to upgrade extracted oil vapors into petroleum products. Various weights of refined, motor-ready petroleum products can as a result be drawn off at appropriate stages from the refining unit. To optimize the operation of the refining unit, light oil vapors and heavy oil vapors may be processed there independently at different times.

Pyrolysis occurs in at least a single kiln line of plural, series-connected, inclined rotary kilns. Each such kiln includes an elongated rotating drum having an input end for receiving oil shale and an output end that is disposed lower than the input end and through which processed oil shale is exhausted. Preferably, a plurality of such kiln lines is disposed in convenient proximity in a kiln array. The kiln lines in a kiln array are so connected to sources of oil shale and fuel as to permit simultaneous, parallel advancement of oil shale through each individual kiln line. A preferred kiln array thus includes two, three, or even more such parallel-connected kiln lines.

A kiln line will typically include at least three series-connected, inclined rotary kilns, although greater numbers, such as four, five or even more such kilns are appropriate in specific circumstances. The initial of the kilns in any kiln line is a pre-heat kiln. In the pre-heat kiln, oil shale granules are dried. The succeeding kilns in the kiln line are indirect-fired from, for example, a surrounding roasting jacket using a chosen heat source of fuel. The fuel used in each roasting jacket is segregated from the oil shale undergoing pyrolysis in the respective kiln with which the roasting jacket is associated. Thus, the fuel does not directly contact any of the oil shale granules being roasted. To utilize the full BTU content of the fuel, exhausted fuel gasses from the roasting jackets of the kilns that succeed the pre-heat kiln are returned to the gasifier for recycling in the system.

Shale granules pass through the kilns in succession, each kiln being maintained at a higher temperature than the preceding kiln. Substantially free of useful hydrocarbons, shale oil granules are exhausted from the kiln line. The shale oil granules thusly exhausted from the kiln line then advance to a heat extraction unit. There heat is recovered from the exhausted oil shale granules as hot air, which is then used in the pre-heat kiln. This optimizes the efficient use of the heat energy that is imparted to shale granules during pyrolysis.

In a kiln line that includes three kilns, typically the kilns in order of increasing temperature are a pre-heat kiln, a first stage pyrolysis kiln, and a second stage pyrolysis kiln. Where larger numbers of kilns are included in a single kiln line, the additional kilns will be employed to create additional stages of pyrolysis intermediate the first and second stages available in a three-kiln kiln line.

In the pre-heat kiln a temperature is maintained in a range of from about 300° F. to about 500° F., more narrowly in a range of from about 350° F. to about 450° F., and most specifically at about 400° F. These temperatures are sufficient to drive off moisture ($H_2O$), drying the oil shale granules that will pass to subsequent kilns of the associated kiln line. The moisture ($H_2O$) driven off in the pre-heat kiln is returned for further use in the gasifier.

In the first stage pyrolysis kiln, true pyrolysis commences. The temperature there is maintained in a range of from about 600° F. to about 850° F., more narrowly in a range of from about 700° F. to about 800° F., and most specifically at about 750° F. Initial oil vapors emerge from the oil shale granules in the first stage pyrolysis kiln. Optimally these may be directed to the refining unit of the system without being allowed to cool.

In the second stage pyrolysis kiln, pyrolysis is completed. The temperature there is maintained in a range of from about 950° F. to about 1100° F., more narrowly in a range of from about 1000° F. to about 1075° F., and most specifically at about 1050° F. Under such conditions, even the heaviest of the useful hydrocarbons remaining in the oil shale granules are extracted as oil vapors. Optimally, these additional oil vapors may be advanced while still hot to the refining unit for distillation and cracking.

B. Preferred Embodiments

The teachings of the present invention presented above will be elaborated upon below making specific reference to exemplary embodiments of the invention depicted in the accompanying figures.

FIG. 1 provides a useful overview of a system and method embodying teachings of the present invention. Accordingly shown therein are the primary elements of a system 10 for producing petroleum products 12 from a raw material 14, such as oil shale. To accomplish that objective, system 10 includes a processing sector 16 that will be seen subsequently to require for implementation corresponding sets of method steps and corresponding assemblies of operatively associated processing apparatus. Activity in processing sector 16 is ultimately driven by a heat source 18 that optimally involves a fuel distinct from the potentially useful hydrocarbons in the oil shale being supplied to processing sector 16.

Such a preferred practice distinguishes, however, between using useful hydrocarbons in the oil shale in the form of oil vapor before that oil vapor is upgraded into petroleum products, and using petroleum products that had originally been derived as oil vapor from the pyrolysis of oil shale. Thus while the teachings of the present invention recommend that the consumption of useful hydrocarbons in oil shale be minimized, or precluded entirely, in the operation of a processing sector, such as processing sector 16, it is not contrary to those teachings to consume refined petroleum products, such as petroleum products 12 that are produced in a processing sector, such as processing sector 16, to drive that same processing sector.

Processing sector 16 includes a pair of primary sub-sectors. An extraction sub-sector 20 of processing sector 16 receives raw material 14 in the form of oil shale. Useful hydrocarbons in the oil shale are extracted by pyrolysis from the oil shale in extraction sub-sector 20 assume the form of oil vapor, which is advanced to a refining sub-sector 22 of processing sector 16 for further processing. In refining sub-sector 22, that oil vapor is upgraded into petroleum products 12, and optimally petroleum products 12 may also there be separated by predetermined criteria, such as weight, type, and use.

FIG. 1 depicts schematically that extraction sub-sector 20 includes a plurality of kilns 24 and an associated, but not necessarily equal, number of roasting jackets 26 that are operatively associated with corresponding kilns 24.

While it is contemplated within the teachings of the present invention that the number of kilns 24 could be equal to the number of roasting jackets 26, more generally, and preferably, the number of roasting jackets 26 will be at least one less than the number of kilns 24. Thus, it is conceivable that the number of roasting jackets 26 could be one, where the number of kilns 24 is two or greater. It is also contemplated that the number of roasting jackets 26 and the number of kilns 24 could be equal at two or more, but it is inconsistent with teachings of the present invention for the number of kilns 24 to be less than two. No upper limit other than practicability is contemplated relative to the number of roasting jackets 26 or on the number of kilns 24 in a system, such as system 10, configured or operated according to teachings of the present invention.

Each of roasting jackets 26 is supplied from heat source 18 with fuel, thereby to cooperate indirectly with the individual kiln corresponding thereto in maintaining pyrolysis of oil shale being advanced through kilns 24. Thus, fuel from heat source 18 can also alternatively be described as being supplied to all or some of kilns 24. As will be seen subsequently by way of example, kilns 24 are in actuality arranged in one or more series-connected groupings that already have been, and will hereinafter be, referred to herein as "kiln lines". The kiln lines of a typical kiln array are generally fed in parallel with raw material 14 in the form of oil shale, as well as with fuel from heat source 18. In this manner, pyrolysis proceeds independently in each kiln line, useful hydrocarbons are extracted from the oil shale advanced through each of the kiln lines, and spent oil shale is exhausted from each of the kiln lines in a from that is substantially free of hydrocarbons.

Optimally, most or even all of the kilns in a kiln line configured and operated according to teachings of the present invention will be inclined rotary kilns. Each such inclined rotary kiln routinely includes an elongated rotatable drum having an input end for receiving oil shale and an output end that is disposed lower than the input end and through which processed oil shale is exhausted. The physical and operational parameters associated with the rotatable drum of each inclined rotary kiln can be varied independently from one another in order to achieve particular desired effects along any portion of the path of advancement of oil shale through a given kiln. Thus the length, diameter, thickness, interior surface configuration, pitch and rate of rotation of each rotatable drum in such a kiln is a design feature to be arrived at with particular attention to the qualities in the oil shale to be processed, the nature of the fuel to be supplied by heat source 18, and the performance specification of any of the various apparatus to be employed in refining sub-sector 22. It is even conceivable that one or more of the rotatable drums in a kiln may be less than perfectly smoothly cylindrical, possibly assuming a polygonal interior cross section, or a symmetric or an offset conical sector in longitudinal cross section.

Figure 2A:
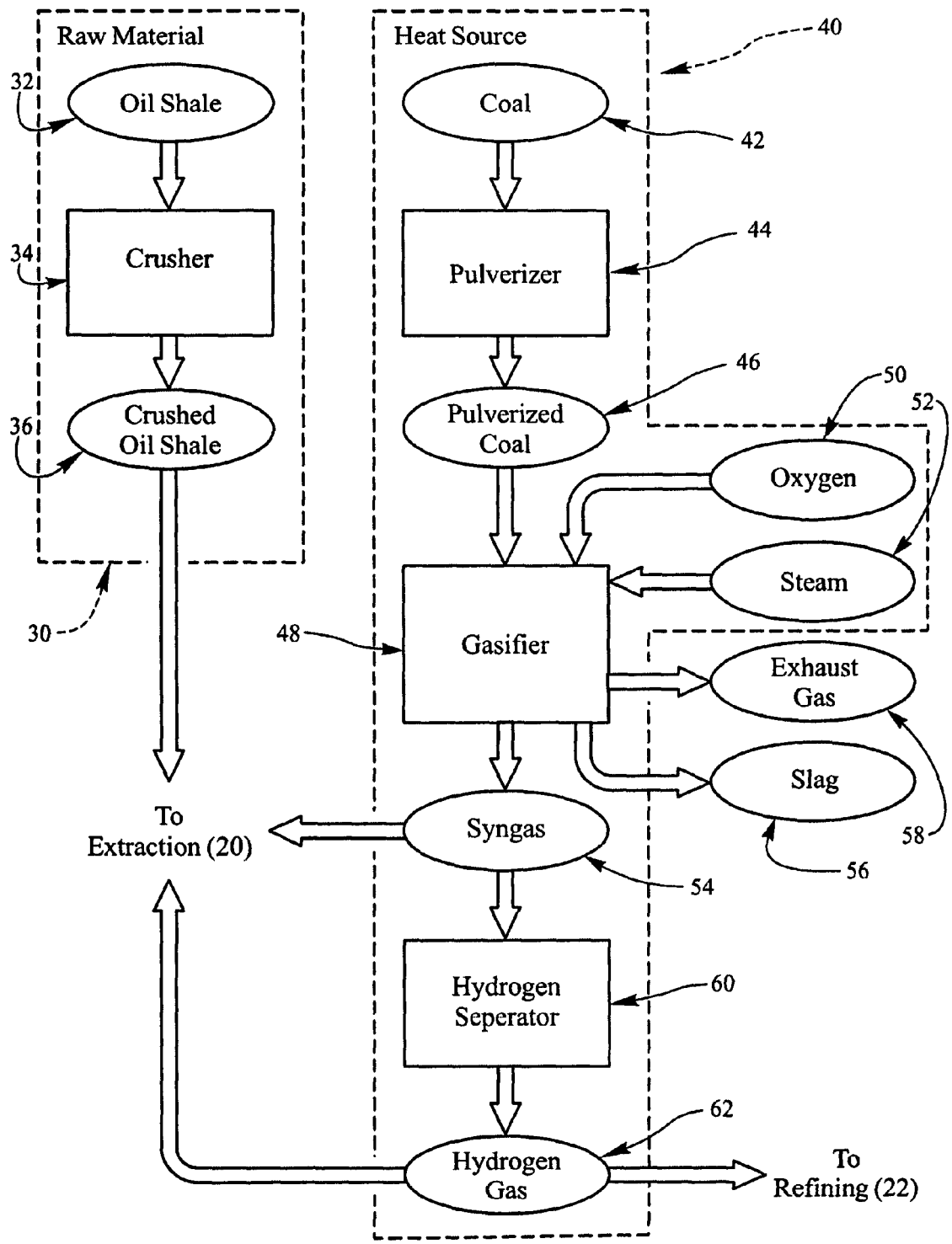
FIGS. 2A and 2B taken together present a detailed diagrammatic depiction of the system and the method of FIG. 1.
Figure 2B:
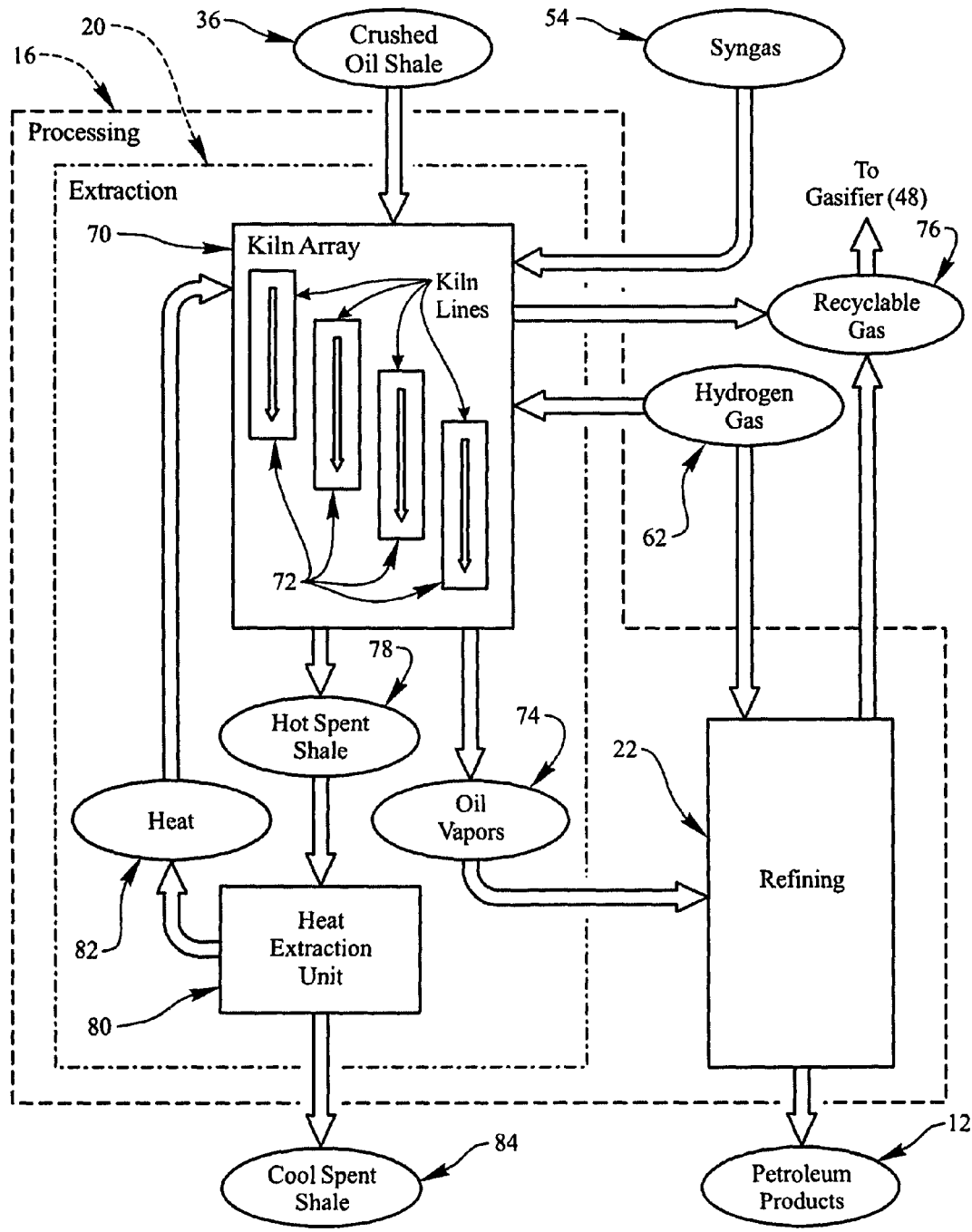

FIGS. 2A and 2B taken together present a detailed diagrammatic depiction of the system and the method of FIG. 1. Each will be discussed in turn below.

In FIG. 2A, what was raw material 14 in FIG. 1 is depicted as a raw material sector 30 of system 10. In raw material sector 30, oil shale 32 is supplied to a crusher 34. Processing in crusher 34 converts oil shale 32 into crushed oil shale 36 comprised optimally of oil shale granules of approximately 0.375 inches in diameter. Crushed oil shale 36 is then advanced to extraction sub-sector 20 in processing sector 16 of system 10.

Also in FIG. 2A, what was heat source 18 in FIG. 1 is depicted as a heat source sector 40. In heat source sector 40, coal 42 is supplied to a pulverizer 44. Processing in pulverizer 44 converts coal 42 into pulverized coal 46 comprised optimally of coal particles of a fineness of about 200 mesh. Pulverized coal 46 is then combined in a solid fuel gasifier 48 with oxygen ($O_2$), such as oxygen 50, and steam ($H_2O$), such as steam 52. In gasifier 48, coal 42 is converted into syngas 54. Slag 56 and exhaust gas 58 are byproducts of this process.

All or some of syngas 54 is advanced to extraction sub-sector 20 in processing sector 16 of system 10. Thus, the fuel corresponding to heat source 40 is a hot gaseous fuel. Optionally, a portion of syngas 54 is supplied to a hydrogen separator 60, where hydrogen gas ($H_2$), such as hydrogen gas 62, is produced. Hydrogen gas 58 has utility in both sub-sectors of processing sector 16 of system 10. Hydrogen gas 58 may be advanced to extraction sub-sector 20 in processing sector 16 to enhance the driving effect of syngas 54 in causing pyrolysis of crushed oil shale 36. Alternatively, or in addition thereto, hydrogen gas 62 may be employed in the hydrogenation in refining sub-sector 22 that upgrades into petroleum products oil vapors containing hydrocarbons extracted from crushed oil shale 36 in extraction sub-sector 20 of system 10.

Finally, it should be noted that an additional type of fuel suitable for supply to extraction sub-sector 20 can be a portion of any petroleum products, such as petroleum products 12 produced in refining sub-sector 22 of processing sector 16 of system 10.

FIG. 2B, presents a detailed diagrammatic depiction of the various apparatus and the method steps encompassed by extraction sub-sector 20 of processing sector 16 in system 10 shown in FIG. 1. While no additional detail is provided in FIG. 2B or elsewhere relative to such aspects of refining sub-sector 22, FIG. 2B does afford a better understanding of the relationship of refining sub-sector 22 to other of the elements of system 10 and extraction sub-sector 20 of processing sector 16 in particular.

Thus, it can be seen that in extraction sub-sector 20, crushed oil shale 36, syngas 54, and hydrogen gas 62 produced in gasifier 48 of FIG. 2A are in actuality supplied to a kiln array 70 that is shown to encompass nominally four kiln lines 72, which will be discussed in greater detail subsequently. In the kilns of kiln lines 72 of kiln array 70, syngas 54 and hydrogen gas 62 drive pyrolysis of crushed oil shale 36, producing from each of kiln lines 72, or from kiln array 70 taken collectively, extracted useful hydrocarbons in the form of oil vapor 74. As a byproduct of these processes, recyclable gas 76 is produced, but recyclable gas 76 is advanced to gasifier 48 as shown for reuse there. Also, exhausted from each of kiln lines 72, or from kiln array 70 taken collectively, is oil shale at an elevated temperature reflective of the pyrolysis process. Being also substantially free of useful hydrocarbons the oil shale exhausted from kiln array 70 is identified in FIG. 2B as hot spent shale 78.

Also included in extraction sub-sector 20 is a heat extraction unit 80. Heat extraction unit 80 receives hot spent shale 78 exhausted from kiln lines 72 in kiln array 70 and recovers heat 82 therefrom, usually in the form of hot air. Heat 82 recovered in heat extraction unit 80 is correspondingly returned to kiln lines 72 in kiln array 70. In each of kiln lines 72, heat 82 is used to pre-heat crushed oil shale 36 destined for eventual pyrolysis therein. As a result of the extraction of heat 82 from hot spent shale 78 by heat extraction unit 80, cool spent shale 84 is discharged from heat extraction unit 80 for transport to a storage location.

Advantageously, refining sub-sector 22 of processing sector 16 is located in close proximity to kiln lines 72 in kiln array 70. Then oil vapor 74 extracted in kiln lines 72 can reach refining sub-sector 22 at a temperature that is substantially undiminished from the temperature oil vapor 74 leaves kiln lines 72 of kiln array 70. In refining sub-sector 22 the commencement of processing of oil vapor 74 at an elevated temperature reduces the amount of fuel, such as hydrogen gas 62 shown, that is required to implement upgrading and sorting. As a byproduct of these processes, recyclable gas 76 is also produced as shown in refining sub-sector 22, but recyclable gas 76 is advanced to gasifier 48 for reuse there.

Figure 3:
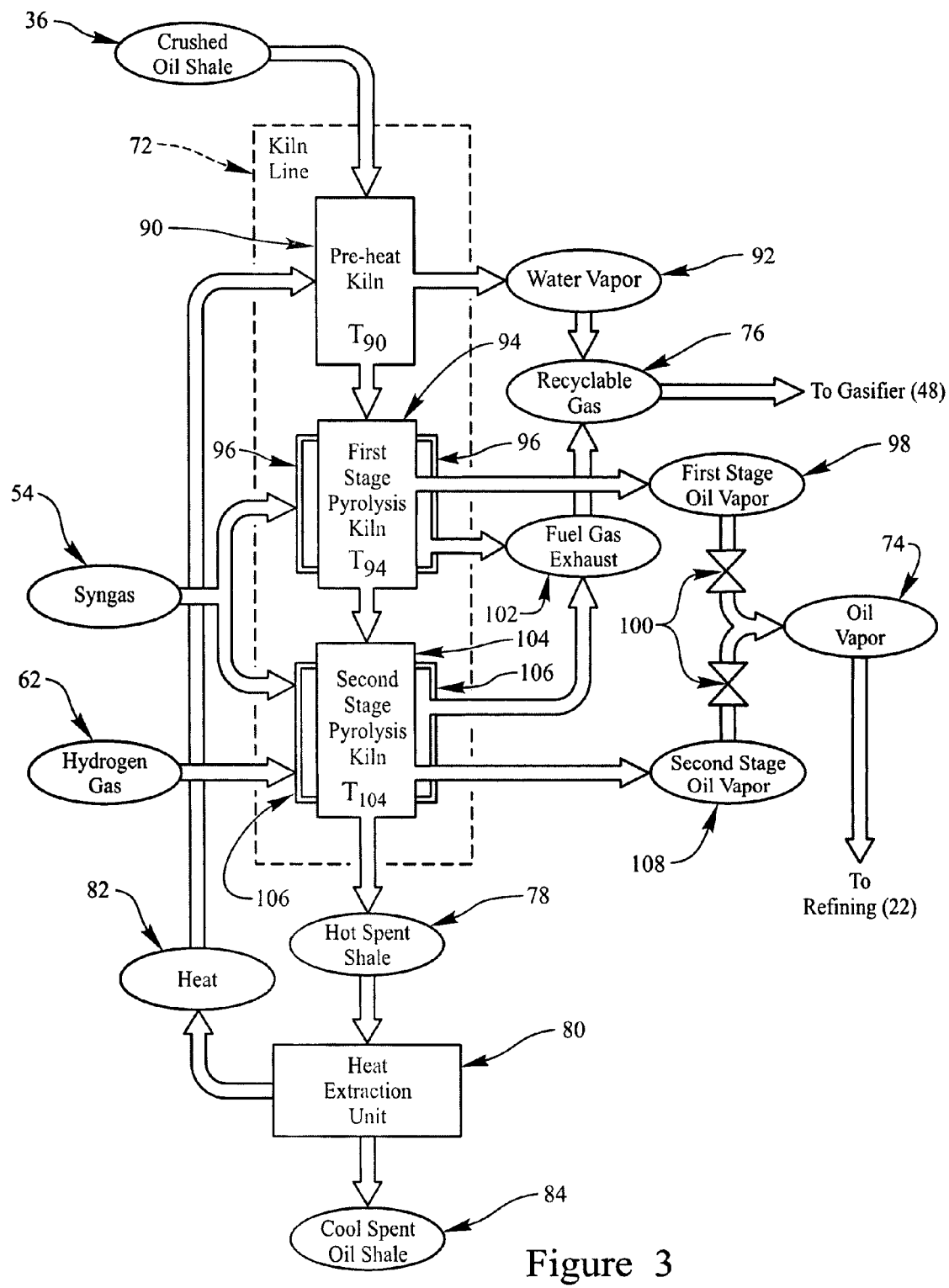
FIG. 3 is a detailed diagrammatic depiction of the apparatus and related methodology associated with one exemplary embodiment of a kiln line of the type shown in the system and the method of FIG. 2B.

FIG. 3 is a detailed diagrammatic depiction of the apparatus and related methodology associated with one exemplary embodiment of a kiln line 72 of the type shown in the system and the method of FIG. 2B. Kiln line 72 includes a plurality of three series-connected inclined rotary kilns, through which crushed oil shale 36 originally containing potentially useful hydrocarbons is advanced during processing in succession through each of the kilns and exhausted from kiln line 72 substantially free of hydrocarbons as hot spent shale 78. Greater numbers of kilns in a kiln line, such as kiln line 72, such as four, five, or even more kilns, are appropriate in specific circumstances. Each successive of the kilns in the direction of the advancement of crushed oil shale 36 maintains a corresponding oil shale processing environment at a temperature higher than the temperature of the oil shale processing environment maintained in the preceding of the kilns.

The initial kiln in kiln line 72 to receive and process crushed oil shale 36 is a pre-heat kiln 90 that is series-connected to the input end of the next kiln in kiln line 72, upstream of that next kiln as determined by direction of the advancement of crushed oil shale 36 during processing in kiln line 72. That direction of advancement of crushed oil shale 36 is indicated in FIG. 3 by the arrows projecting from the lower edge of each of the kilns included in FIG. 3. Pre-heat kiln 90 is an inclined rotary kiln that maintains a corresponding oil shale drying environment at a drying temperature $T_{90}$ at which moisture ($H_2O$), identified in FIG. 3 as water vapor 92, is removed from crushed oil shale 36. Then crushed oil shale 36 enters the next kiln in kiln line 72. Pre-heat kiln 90 uses heat 82 recovered from hot spent shale 78 exhausted from kiln line 72.

The next kiln in kiln line 72 is series-connected to the output end of pre-heat kiln 90. This second kiln is identified in FIG. 3 as first stage pyrolysis kiln 94. First stage pyrolysis kiln 94 receives for processing dried, crushed oil shale 36, which at that stage of processing yet contains all of the potentially useful hydrocarbons therein. First stage pyrolysis kiln 94 maintains therewithin a corresponding oil shale processing environment in which initial pyrolysis occurs. Accordingly, oil shale processing environment maintained in first stage pyrolysis kiln 94 will also be referred as a first oil shale pyrolysis environment. The temperature of the first oil shale pyrolysis environment is maintained at a first pyrolysis temperature $T_{94}$. First pyrolysis temperature $T_{94}$ is greater than drying temperature $T_{90}$ maintained in pre-heat kiln 90 by approximately 300° F., or more.

This is accomplished by the operative association of a first roasting jacket 96 with first stage pyrolysis kiln 94. First roasting jacket 96 is supplied as shown with sufficient syngas 54 to indirectly maintain the requisite first oil shale processing environment in first stage pyrolysis kiln 94. Any components of syngas 54 that are incompletely combusted in first roasting jacket 96 is withdrawn as fuel gas exhaust 102 and forwarded as a component of recyclable gas 76 to gasifier 48 as shown.

As a result, first stage pyrolysis kiln 94 produces first stage oil vapor 98 that contains an initial quantity of the useful hydrocarbons in dried crushed oil shale 36. First stage oil vapor 98 is a component of oil vapor 74 that is forwarded to refining sub-sector 22 for upgrading into petroleum products 12. Valving 100 in the path of flow of first stage oil vapor 98 permits the type or types of oil vapor reaching refining sub-sector 22 to be controlled toward optimizing the operation thereof.

The next kiln in kiln line 72 is series-connected to the output end of first stage pyrolysis kiln 94. This second kiln is identified in FIG. 3 as second stage pyrolysis kiln 104. Second stage pyrolysis kiln 104 receives for processing dried and partially exhausted crushed oil shale 36, which at that stage of processing yet contains some, particularly the heavier, of the potentially useful hydrocarbons therein. Second stage pyrolysis kiln 104 maintains therewithin a corresponding oil shale processing environment in which additional pyrolysis occurs. Accordingly, the oil shale processing environment maintained in second stage pyrolysis kiln 104 will also be referred as a second oil shale pyrolysis environment. The temperature of the second oil shale pyrolysis environment is maintained at a second pyrolysis temperature $T_{104}$. Second pyrolysis temperature $T_{104}$ is greater than first pyrolysis temperature $T_{94}$ maintained in first stage pyrolysis kiln 94 by approximately 300° F., or more.

This is accomplished by the operative association of a second roasting jacket 106 with second stage pyrolysis kiln 104. Second roasting jacket 106 is supplied as shown with sufficient syngas 54 supplemented as desired by hydrogen gas 62 to indirectly maintain the requisite second oil shale processing environment in second stage pyrolysis kiln 104. Any components of syngas 54 or hydrogen gas 62 that are incompletely combusted in second roasting jacket 106 is withdrawn as fuel gas exhaust 102 and forwarded as a component of recyclable gas 76 to gasifier 48 as shown.

As a result, second stage pyrolysis kiln 104 produces second stage oil vapor 108 that contains an additional quantity of the useful hydrocarbons in dried and partially exhausted crushed oil shale 36. Second stage oil vapor 108 is a component of oil vapor 74 that is forwarded to refining sub-sector 22 for upgrading into petroleum products 12. Valving 100 in the path of flow of second stage oil vapor 98 permits the type or types of oil vapor reaching refining sub-sector 22 to be controlled toward optimizing the operation thereof.

Ranges of temperatures in typical kilns, such as first stage pyrolysis kiln 94 and second stage pyrolysis kiln 104, have already been provided above. Each included a corresponding optimum temperature corresponding to the respective pyrolysis temperatures named above. Accordingly, in a three-kiln line, such as kiln line 73 shown in FIG. 3, first pyrolysis temperature $T_{94}$ would be about 750° F. and second pyrolysis temperature $T_{104}$ would be about 1050° F.

Where larger numbers of kilns are included in a single kiln line, the additional kilns will be employed to create additional stages of pyrolysis intermediate the first and second stages available in a three-kiln kiln line. Thus in a four-kiln kiln line, the temperatures maintained in the three pyrolysis kilns would be respectively along the path of advancing oil shale about 650° F., about 850° F., and about 1050° F. In a five-kiln kiln line, the temperatures maintained in the four pyrolysis kilns would be respectively along the path of advancing oil shale about 600° F., about 800° F., about 950° F., and about 1050° F.

C. Methodology

The inventive technology also includes corresponding methods.

Accordingly, such a method for producing petroleum products from oil shale includes the step of heating oil shale containing hydrocarbons in an inclined rotary pre-heat kiln to produce dry oil shale. This is followed by the step of extracting initial hydrocarbons from the dry oil shale in an inclined rotary first pyrolysis kiln that is series-connected to the output end of the pre-heat kiln. Additional hydrocarbons are extracted from the oil shale processed through the first pyrolysis kiln using an inclined rotary second pyrolysis kiln that is series-connected to the output end of the first pyrolysis kiln.

The heating of the inclined rotary pre-heat kiln is conducted using heat recovered from oil shale processed through the second pyrolysis kiln. Each of the steps of extracting are conducted by indirectly roasting the contents of the first and second pyrolysis kilns using a heat source comprising a fuel distinct from hydrocarbons in oil shale. To obtain some or all of the fuel corresponding to the heat source, the inventive method may include the steps of separating hydrogen gas from other gasses, and employing that hydrogen as fuel. Alternatively or in addition thereto, the inventive method may include the steps of gasifying a solid into a combustible product, and employing that combustible product as the fuel corresponding to the heat source.

The inventive method may also include the additional step of refining individually or together the hydrocarbons extracted, respectively, in the first and second pyrolysis kilns. This is accomplished by upgrading either or both of those groups of extracted hydrocarbons into petroleum products and then separating the petroleum products by predetermined criteria.

The foregoing description of the invention has been presented for the purposes of promoting clarity and conveying a complete understanding of the present invention. The description thus presented is not intended to cause the present invention to be limited merely to the precise embodiments thereof disclosed. Various modifications of those embodiments are possible that remain nonetheless within the scope and equivalence properly to be accorded to the appended claims.

What is claimed is:

1. A method for producing petroleum products from oil shale, the method comprising the steps of
    (a) processing oil shale into oil shale granules of a predetermined diameter;
    (b) entering said oil shale granules into a kiln line of series-connected kilns;
    (c) removing moisture from said oil shale granules in a first kiln in said kiln line to produce dry oil shale granules;
    (d) feeding said dry oil shale granules into a second kiln in said kiln line;
    (e) indirectly roasting said dry oil shale granules in said second kiln to a temperature sufficient to cause pyrolysis;
    (f) withdrawing from said second kiln oil vapors containing hydrocarbons freed from said dry oil shale granules during said step of indirectly roasting in said second kiln; and
    (g) exhausting said oil shale from said kiln line substantially free of hydrocarbons.

2. A method for producing petroleum products from oil shale, the method comprising the steps of:
    (a) entering oil shale containing hydrocarbons into a kiln line of series-connected kilns;
    (b) advancing said oil shale through individual of said kilns in succession;
    (c) maintaining in each of said kilns an oil shale processing environment at a temperature higher than the temperature of the oil shale processing environment maintained in the preceding of said kilns;
    (d) indirectly roasting said oil shale in each of said kilns;
    (e) withdrawing from each of said kilns oil vapors containing hydrocarbons freed from said oil shale during said step of indirectly roasting; and
    (f) exhausting said oil shale from said kiln line substantially free of hydrocarbons.

3. A method as recited in claim 2, wherein said step of withdrawing comprises the steps of:
    (a) extracting initial hydrocarbons from said dry oil shale in an inclined rotary first pyrolysis kiln series-connected to the output end of said pre-heat kiln; and
    (b) extracting additional hydrocarbons from said oil shale processed through said first pyrolysis kiln in an inclined rotary second pyrolysis kiln series-connected to the output end of said first pyrolysis kiln.

4. A method as recited in claim 1, further comprising the step of refining said hydrocarbons extracted in said first pyrolysis kiln by upgrading said hydrocarbons into petroleum products and separating said petroleum products by predetermined criteria.

5. A method as recited in claim 3, further comprising the step of refining said hydrocarbons extracted in said second pyrolysis kiln by upgrading said hydrocarbons into petroleum products and separating said petroleum products by predetermined criteria.

6. A method as recited in claim 3, wherein said steps of extracting are conducted by indirectly roasting the contents of said first and said second pyrolysis kilns.

7. A method as recited in claim 6, wherein said steps of extracting are conducted using a heat source comprising a fuel distinct from hydrocarbons in oil shale.

8. A method as recited in claim 7, further comprising the steps of:
    (a) separating hydrogen gas from other gasses; and
    (b) employing said hydrogen gas from said step of separating as said fuel corresponding to said heat source.

9. A method as recited in claim 7, further comprising the steps of:
    (a) gasifying a solid into a combustible product; and
    (b) employing said combustible product from said step of gasifying as said fuel corresponding to said heat source.

10. A method as recited in claim 2, further comprising the step of removing moisture from said oil shale prior to said step of entering said oil shale into said kiln line.

11. A method as recited in claim 10, further comprising the steps of:
    (a) recovering heat from said oil shale substantially free of hydrocarbons produced in said step of exhausting; and
    (b) using said heat in said step of removing moisture.

12. A method as recited in claim 2, further comprising the step of refining said oil vapors withdrawn from each of said second kilns during said step of indirectly roasting.

13. A method as recited in claim 12, wherein said step of refining comprises the steps of:
    (a) upgrading said hydrocarbons contained in said oil vapors into petroleum products; and
    (b) separating said petroleum products by predetermined criteria.

14. A method as recited in claim 2, further comprising the step of heating oil shale containing hydrocarbons in an inclined rotary pre-heat kiln to produce dry oil shale.

15. A method as recited in claim 14, wherein said step of heating is conducted using heat recovered from oil shale processed through said second pyrolysis kiln.

16. A method for producing petroleum products from oil shale, the method comprising the steps of:
 (a) processing oil shale into oil shale granules of a predetermined diameter;
 (b) entering said oil shale granules into a kiln line of series-connected kilns;
 (c) removing moisture from said oil shale granules in a first kiln in said kiln line to produce dry oil shale granules;
 (d) feeding said dry oil shale granules into a second kiln in said kiln line;
 (e) indirectly roasting said dry oil shale granules in said second kiln to a temperature sufficient to cause pyrolysis;
 (f) withdrawing from said second kiln oil vapors containing hydrocarbons freed from said dry oil shale granules during said step of indirectly roasting in said second kiln;
 (g) converting coal into syngas; and
 (h) employing said syngas as a heat source in said step of indirectly roasting in said second kiln.

17. A method as recited in claim 16, wherein said second kiln has an input end, an output end, and a longitudinal extent therebetween, and said method further comprises the step of advancing said dry oil shale granules longitudinally through said second kiln from said input end to said output end during said step of indirectly roasting in said second kiln.

18. A method as recited in claim 17, wherein said step of advancing comprises the step of tumbling said dry oil shale granules in said second kiln about said longitudinal extent of said second kiln and toward said output end of said second kiln.

19. A method as recited in claim 18, wherein said step of tumbling comprises the steps of:
 (a) inclining said second kiln downwardly from said input end toward said output end thereof; and
 (b) rotating said second kiln about said longitudinal extent thereof.

20. A method as recited in claim 16, wherein said step of indirectly roasting in said second kiln comprises the steps of:
 (a) circumscribing said second kiln with a roasting jacket isolated atmospherically from the interior of said second kiln;
 (b) directing combustion gas into said roasting jacket from a heat source distinct from hydrocarbons in oil shale; and
 (c) advancing said dry oil shale granules longitudinally through said second kiln from an input end to an output end thereof.

21. A method as recited in claim 20, wherein said step of advancing comprises the steps of:
 (a) inclining said second kiln downwardly from said input end toward said output end thereof; and
 (b) rotating said second kiln about a longitudinal extent thereof.

22. A method as recited in claim 16, further comprising the step of refining said oil vapors withdrawn from said second kiln during said step of indirectly roasting in said second kiln.

23. A method as recited in claim 22, wherein said step of refining comprises the steps of:
 (a) upgrading said hydrocarbons contained in said oil vapors into petroleum products; and
 (b) separating said petroleum products by predetermined criteria.

24. A method as recited in claim 23, further comprising the steps of:
 (a) separating hydrogen gas from other gasses; and
 (b) employing said hydrogen gas in said step of upgrading.

25. A method as recited in claim 16, further comprising the steps of:
 (a) separating hydrogen gas from said syngas; and
 (b) employing said hydrogen gas to upgrade said hydrocarbons contained in said oil vapors into petroleum products.

26. A method as recited in claim 16, further comprising the steps of:
 (a) recovering heat from said dry oil shale granules following said step of indirectly roasting in said second kiln; and
 (b) using said heat in said step of removing moisture.

27. A method as recited in claim 16, further comprising the steps of:
 (a) passing said dry oil shale granules following said step of indirectly roasting in said second kiln into a third kiln in said kiln line;
 (b) indirectly roasting said dry oil shale granules in said third kiln to a temperature greater than the temperature in said second kiln; and
 (f) withdrawing from said third kiln oil vapors containing hydrocarbons freed from said dry oil shale granules during said step of indirectly roasting in said third kiln.

28. A method as recited in claim 27, wherein said step of indirectly roasting in said third kiln comprises the steps of:
 (a) circumscribing said third kiln with a roasting jacket isolated atmospherically from the interior of said second kiln;
 (b) directing combustion gas into said roasting jacket from a heat source distinct from hydrocarbons in oil shale; and
 (c) advancing said dry oil shale granules longitudinally through said third kiln from an input end to an output end thereof.

29. A method as recited in claim 28, wherein said step of advancing comprises the step of tumbling said dry oil shale granules in said third kiln about a longitudinal extent of said third kiln and toward said output end of said third kiln.

30. A method as recited in claim 29, wherein said step of tumbling comprises the steps of:
 (a) inclining said third kiln downwardly from said input end toward said output end thereof; and
 (b) rotating said third kiln about said longitudinal extent thereof.

31. A method for producing petroleum products from oil shale, the method comprising the steps of:
 (a) converting oil shale in a preheat kiln to produce dry oil shale;
 (b) entering said dry oil shale into a first kiln in a kiln line of series-connected kilns, said first kiln having an input end, an output end, and a longitudinal extent therebetween;
 (c) indirectly roasting said dry oil shale in said first kiln to a temperature sufficient to cause pyrolysis;
 (d) tumbling said dry oil shale in said first kiln about said longitudinal extent of said first kiln and toward said output end of said first kiln;
 (e) withdrawing from said first kiln oil vapors containing hydrocarbons freed from said dry oil shale during said step of indirectly roasting in said first kiln;
 (f) passing said dry oil shale following said step of indirectly roasting in said first kiln into a second kiln in said kiln line, said second kiln having an input end, an output end, and a longitudinal extent therebetween;

(g) indirectly roasting said dry oil shale in said second kiln to a temperature greater than said temperature in said first kiln;

(h) tumbling said dry oil shale in said second kiln about said longitudinal extent of said second kiln and toward said output end of said second kiln;

(i) withdrawing from said second kiln oil vapors containing hydrocarbons freed from said dry oil shale during said step of indirectly roasting in said second kiln;

(j) recovering heat from said dry oil shale following said step of indirectly roasting in said second kiln;

(k) using said heat in said step of converting; and (l) exhausting said oil shale from said kiln line substantially free of hydrocarbons.

32. A method as recited in claim 31, wherein said step of tumbling said dry oil shale in said first kiln comprises the steps of:
  (a) inclining said first kiln downwardly from said input end toward said output end thereof; and
  (b) rotating said first kiln about said longitudinal extent thereof.

33. A method as recited in claim 32, wherein said step of indirectly roasting in said first kiln comprises the steps of:
  (a) circumscribing said first kiln with a first roasting jacket isolated atmospherically from the interior of said first kiln;
  (b) directing combustion gas into said first roasting jacket from a heat source distinct from hydrocarbons in oil shale; and
  (c) advancing said dry oil shale granules longitudinally through said first kiln from said input end to said output end thereof.

34. A method as recited in claim 32, wherein each of said steps of indirectly roasting comprises the steps of:
  (a) converting coal into syngas; and
  (b) employing said syngas as a heat source in each of said steps of indirectly roasting.

35. A method as recited in claim 31, wherein said step of indirectly roasting in said second kiln comprises the steps of:
  (a) circumscribing said second kiln with a second roasting jacket isolated atmospherically from the interior of said second kiln;
  (b) directing combustion gas into said second roasting jacket from a heat source distinct from hydrocarbons in oil shale; and
  (c) advancing said dry oil shale granules longitudinally through said second kiln from an input end to an output end thereof.

36. A method as recited in claim 31, wherein said steps of indirectly roasting are conducted using a heat source distinct from hydrocarbons in oil shale.

37. A method as recited in claim 31, wherein said step of tumbling said dry oil shale in said second kiln comprises the steps of:
  (a) inclining said second kiln downwardly from said input end toward said output end thereof; and
  (b) rotating said second kiln about said longitudinal extent thereof.

* * * * *